Feb. 15, 1944.   I. L. PEARSON   2,341,809
INDICATOR
Filed Sept. 15, 1941
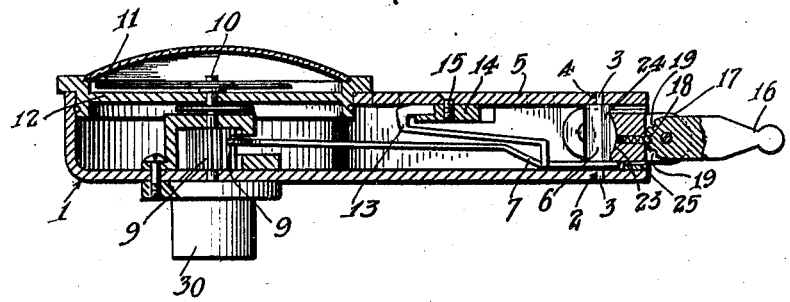
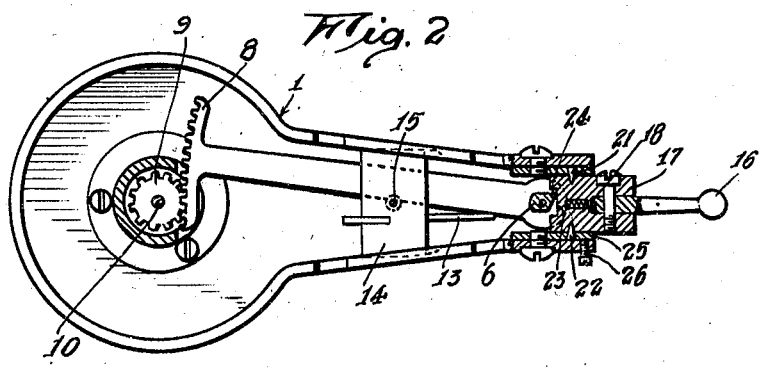
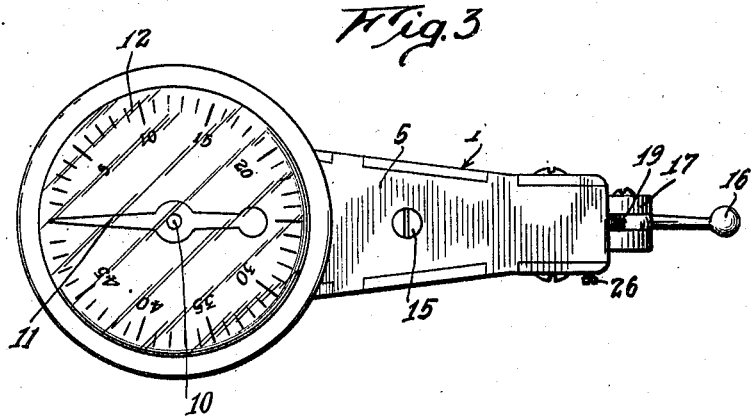
Inventor
Ivar L. Pearson
By Lyon & Lyon
Attorneys Patented Feb. 15, 1944

2,341,809

UNITED STATES PATENT OFFICE 2,341,809

INDICATOR

Ivar L. Pearson, Los Angeles, Calif.

Application September 15, 1941, Serial No. 410,910

5 Claims. (Cl. 33—172)

My invention relates to an indicator, and more particularly to an indicator for use in connection with a lathe or milling machine to indicate the amount of material removed, or to be removed, in turning and milling operations, and the inaccuracies in cylindrical and plane surfaces.

In the indicators now known in the art, the readings are generally in the thousandths of inches and because of the nature of the operable parts of the indicator the largest readings are usually only 10 or 12 thousandths. By the novel construction of my indicator the number of thousandths which the indicator will register is between 50 and 75 thousandths.

In order to secure a greater amount of thousandths some indicators rely on a chain of gears which greatly increases the cost of the instrument, and also decreases its accuracy. In my invention I have provided a new system of lever arms and contact points which permits a longer stroke to the indicator feelers, and therefore permits large readings and still maintains great accuracy, and cheapness of construction.

It is, therefore, an object of my invention to provide an indicator which will have a large capacity without the use of a long train of gears.

Another object of my invention is to provide an indicator which can be mounted on a lathe or milling machine with the face in a horizontal position for ease in reading.

Another object of my invention is to provide an accurate indicator which can be cheaply manufactured.

Other objects and advantages of my invention will be apparent from the following description of the preferred embodiment of the invention.

In the drawing:

Fig. 1 is a cross section of my indicator.

Fig. 2 is a plan view, partialily in section with the dial and cover removed.

Fig. 3 is a plan view.

Referring to the drawing, I provide a case 1 having a bearing 2 for rotatively carrying one end of the pin 3. The other end of the pin 3 is rotatively carried in the bearing 4 in the case cover 5. The bearings 2 and 4 are in alignment.

The pin 3 carries a trunnion 6 on an arm 7, both being rigidly attached thereto.

Rotation of the trunnion 6 and the arm 7 is transmitted by gears 8 and 9 to the axle 10 of the indicator arrow 11. The axle 10 is rotatively mounted in the case 1.

I provide a dial 12 calibrated in thousandths of an inch for reading the rotation of the arrow 11, which is mounted to lie in a horizontal position when the indicator is secured by clamping to the boss 30.

A feature of my invention is that whether the material to be removed, or the inaccuracy of surface, is plus or minus, the indicator always reads in one direction and the user need not stop and add or subtract to determine the amount of inaccuracy. This feature permits the use of a single spring 13, one end of which urges the arm 9 always in one direction and the other end of which is fastened to the cross member 14 to which the case cover 5 is fastened by the bolt 15.

To engage the work and register the inaccuracies thereon, I provide a feeler 16 pivotally mounted in a trunnion block 17 and held in any one of several positions by the spring-actuated ball 18 engaging in any one of the slots 19.

The trunnion block 17 is rotatively mounted on the pintles 21 and 22 and has an inner curved surface 23 for engaging the edge 24 of the trunnion 6. Because of its curved surface 23 the edge 24 of the trunnion 6 is engaged at both its upper and lower ends only when the trunnion block 17 is in a neutral position. Rotation of the trunnion block 17 either upwardly or downwardly by movement of the feeler 16 will cause the trunnion 6 to rotate because of the contact of the edge 24 with either the upper or the lower portion of the curved surface 23 and regardless of which way the feeler 16 is moved from its neutral position the trunnion 6 will rotate in the same direction.

A feature of my invention is that movement of the feeler 16 and the trunnion block 17 is in a vertical direction and the movement of the trunnion 6 caused by the pressure of the surface 23 on the edge 24 is in a horizontal direction. This translation of movement from vertical to horizontal permits the use of my indicator above or at the side of the work and with the dial 12 in a horizontal position, easy to read.

It is apparent that because of the very short lever arm between the pins 3 on which the trunnion rotates and the edge 24 and the great length of the arm 7 between its pivot pin 3 and its extremity, the gear 8, the indicator is able to register a larger difference in thousandths of an inch without increasing the size of the instrument and also to allow the thousandths to be well spread on the dial 12 for better vision.

The pintles 21 and 22 are carried by a U-shaped strap 25 bolted to the case 1. In assembling my indicator this permits relative movement between the trunnion block 17 and the trunnion 6 to position them so that in a vertical position the face 23 engages the edge 24 at both top and bottom.

In the making and machining of the trunnion block 17 and the pintles 21 and 22, it is not always possible to secure a perfect fit. Any cross movement or slip on the pintles would cause inaccuracies in the indicator. I, therefore, provide a set screw 26, threaded into the case 1, which can be tightened against the U-strap 25 to squeeze together the arms of the U and take out lateral play of the trunnion block 17 on the pintles 21 and 22.

A feature of my invention is that when the indicator is mounted by clamping onto the boss 30 the dial is in a horizontal position and the feeler 16 can be moved to project downwardly by pivoting it, causing the ball 18 to hold it fixed by engaging in the lowermost slot 19. In this position the feeler 16 moves in a vertical plane but transmits its motion to the arrow 11 turning in a horizontal plane.

While I have described a preferred embodiment of my invention, I am not to be limited to any of the specific details described therein, except as described in the appended claims.

I claim:

1. In an indicator, a case, a trunnion block pivotally carried by said case, a feeler carrier by said trunnion block, a trunnion pivotally carried by said case, means affixed to said trunnion for actuating an indicator, an indicator for indicating the rotation of said trunnion, a knife edge on said trunnion parallel to its pivot and offset from a line extending from the trunnion axis to said trunnion block, a face on said trunnion block engaging said knife edge on opposite sides of the pivotal axis of said trunnion block, said trunnion and trunnion block having their axes perpendicular to each other.

2. In an indicator, a case, a trunnion block pivotally carried by said case, a feeler carried by said trunnion block, a trunnion pivotally carried by said case, a knife edge on said trunnion parallel to its pivot and offset from a line extending from the trunnion axis to said trunnion block, a face on said trunnion block engaging said knife edge on opposite sides of the pivotal axis of said trunnion and trunnion block, said trunnion and trunnion block having their axes perpendicular to each other, an arm affixed to said trunnion, a gear train connecting a rotating needle to said arm whereby movement of said arm is transferred to rotation of said needle, and a scale whereby the amount of rotation of said needle can be indicated.

3. In an indicator, a case, a trunnion block pivotally carried by said case, a feeler carried by said trunnion block, a trunnion pivotally carried by said case, a knife edge on said trunnion parallel to its pivot and offset from a line extending from the trunnion axis to said trunnion block, a concave face on said trunnion block engaging said knife edge on opposite sides of the pivotal axis of said trunnion block, said trunnion and trunnion block having their axes perpendicular to each other.

4. In an indicator, a case, a trunnion block pivotally carried by said case, a feeler carried by said trunnion block, means for holding said feeler affixed in several positions for rotation in said trunnion block, a trunnion pivotally carried by said case, a knife edge on said trunnion parallel to its pivot and offset from a line extending from the trunnion axis to said trunnion block, a concave face on said trunnion block engaging said knife edge on opposite sides of the pivotal axis of said trunnion block, said trunnion and trunnion block having their axes perpendicular to each other.

5. In an indicator, a case, a trunnion block pivotally carried by said case, a feeler carried by said trunnion block, a trunnion pivotally carried by said case, a knife edge on said trunnion parallel to its pivot and offset from a line extending from the trunnion axis to said trunnion block, a face on said trunnion block engaging said knife edge on opposite sides of the pivotal axis of said trunnion block, said trunnion and trunnion block having their axes perpendicular to each other, a spring to continually urge said trunnion in one direction, means for indicating the rotation of said trunnion, and means affixed to said trunnion for actuating said indicating means.

IVAR L. PEARSON.